Patented Nov. 20, 1934

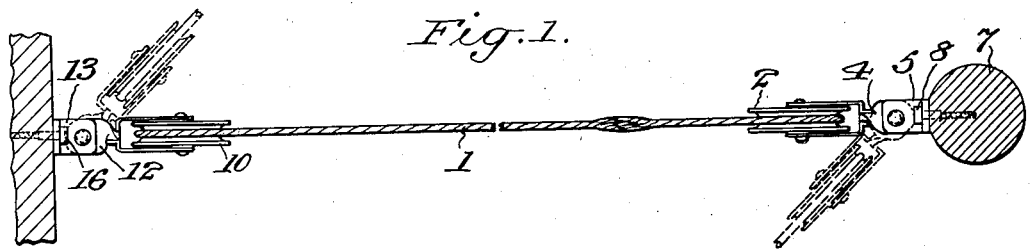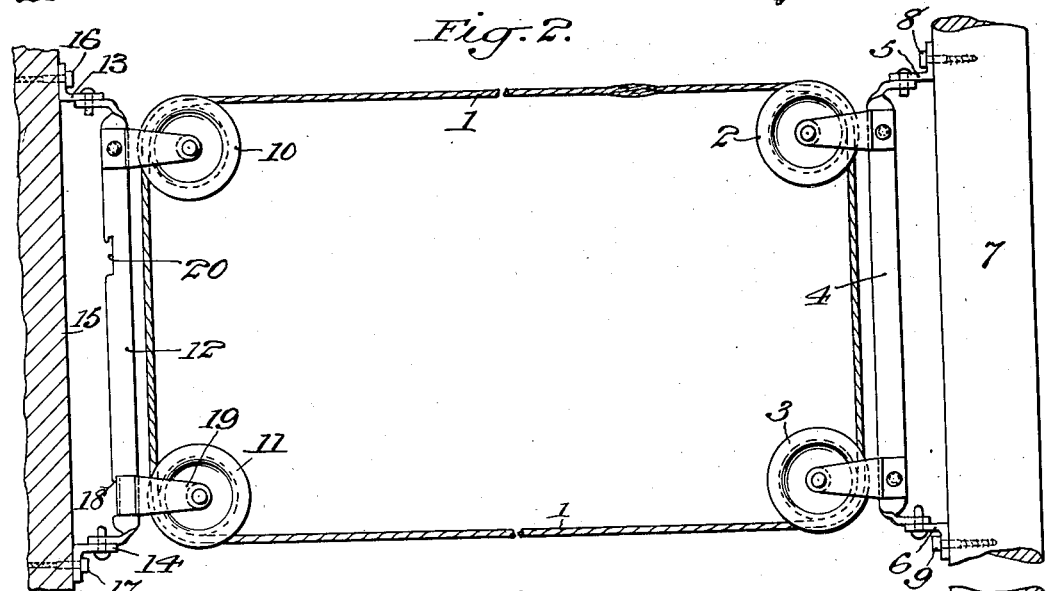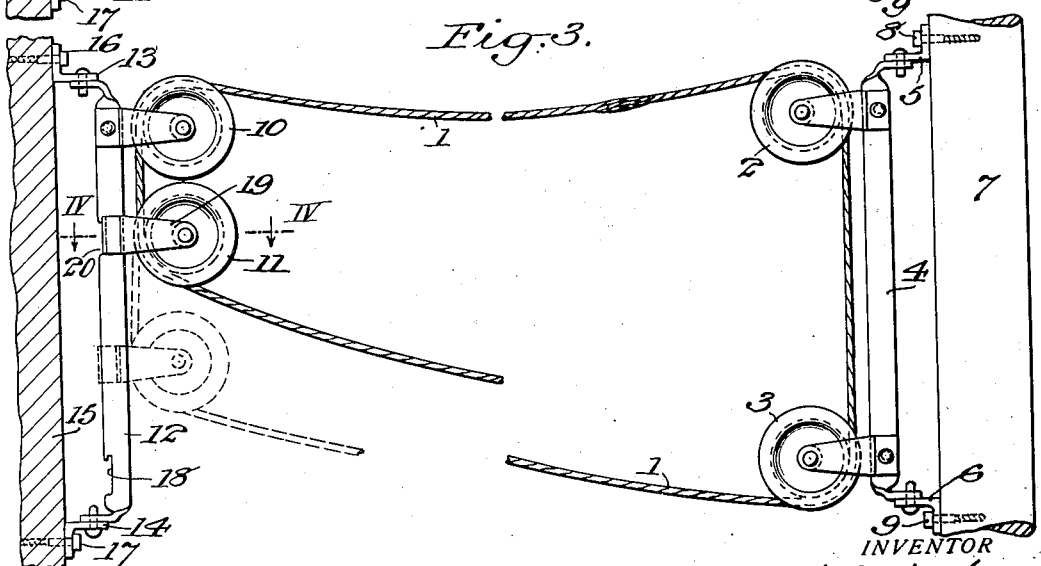

1,981,482

UNITED STATES PATENT OFFICE 1,981,482

CLOTHESLINE HANGER

William H. Urbach, Astoria, N. Y.

Application April 7, 1934, Serial No. 719,434

3 Claims. (Cl. 68—3)

My invention comprises a clothesline hanger in which an endless clothesline which passes around a plurality of spaced pulleys may be quickly and easily tightened or loosened by the movement of one of the pulleys away from or toward another pulley, means being provided to releasably lock the movable pulley in its line tightening position and also, if desired, in its line loosening position.

My invention further comprises a clothesline holder of the above character in which two laterally swinging brackets are provided, upper and lower pulleys being fast on one of the brackets, an upper pulley being fast on the other bracket and a lower pulley being movable on the last named bracket toward and away from its upper pulley, the bracket being provided with an undercut recess for automatically locking the lower pulley in its line tightening position and, if so desired, with an upper undercut recess for automatically locking the lower pulley in its line loosening position.

A practical embodiment of my invention is represented in the accompanying drawing, in which Fig. 1 represents a top plan view of my improved clothesline holder, the supports for the two brackets being shown in cross section and the two brackets being shown in dotted lines in laterally swung positions;

Fig. 2 represents a side view of the clothesline hanger with the parts in the position they assume when the line is tightened;

Fig. 3 represents a similar view with the parts in the positions they assume when the line is loosened and the movable pulley is locked in its line loosening position; the movable pulley being also shown in dotted lines in an intermediate line loosening position where it is not locked; and Fig. 4 represents a detail cross section through the movable pulley taken in the plane of the line IV—IV of Fig. 3, looking in the direction of the arrows.

The endless clothesline is denoted by 1, which clothesline passes around upper and lower pulleys 2 and 3 fast on a laterally swinging vertically disposed bracket bar 4 pivoted to swing laterally between upper and lower bracket members 5 and 6, which bracket members may be secured to a post of other vertical support 7 as, for instance, by screw bolts 8, 9.

This clothesline also passes around upper and lower pulleys 10 and 11 carried by a vertically disposed bracket bar 12, pivoted to swing laterally between upper and lower bracket members 13 and 14, which bracket members may be secured to a vertical support 15, as, for instance, by screw bolts 16 and 17.

The upper pulley 10 is fast on the vertically disposed bracket bar 12 and the lower pulley 11 is slidably interlocked with the said bar whereby the lower pulley may be slid along the bracket bar 12 toward and away from the upper pulley to respectively loosen and tighten the clothesline 1.

Means are provided for automatically locking the lower pulley 11 in its clothesline tightening position, which means in the present instance is shown as a recess 18 having an undercut end which is adapted to receive and retain the block 19 of the pulley 11.

If so desired, means may be provided for automatically locking the slidable pulley 11 in its clothesline loosening position, said means in the present instance being shown as a recess 20 having an undercut end for receiving and retaining the block 19 of the slidable pulley 11.

From the above description it will be seen that I have provided a hanger for endless clotheslines which is very simple, inexpensive to manufacture and readily applied in its operative position. It will also be seen that I have provided a very simple means for loosening the line when not in use.

It will also be seen that by making all of the pulleys fast on their supporting brackets, except the line tightening and loosening pulley, and by having this last named pulley slidably interlocked with its bracket bar the usual noises and squeaking of the pulleys are eliminated; the ability of the supporting brackets to be swung laterally on their supports permitting the leading of the clothesline from its inner support to wherever the outer support is placed with respect to the inner support.

It is evident that various changes may be resorted to in the construction, form and arrangement of the several parts without departing from the spirit and scope of my invention, and hence I do not intend to be limited to the particular embodiment herein shown and described.

What I claim is:

1. In a device for tensioning clotheslines, a bracket having an elongated portion, a first pulley supported adjacent one end of said elongated portion, a pulley carrying member having a portion slidable upon said elongated portion, and a second pulley carried by said member in spaced relationship to said slidable portion, said elongated portion of said bracket having a recess adjacent its end remote from said first pulley engageable by said pulley carrying member when in its position remote from said first pulley, said recess being configurated to resist rotative and sliding movement of said member relative to said bracket and toward said first pulley due to line tension.

2. In a device for tensioning clotheslines, a bracket having a vertically disposed elongated portion, an upper pulley supported by said bracket adjacent the upper end of said elongated portion, a pulley carrying member having a portion slidable upon said elongated portion, and a lower pulley supported by said member in spaced relationship to said slidable portion, said elongated portion of said bracket having a recess adjacent its lower end engageable by said member in its lowermost position, said recess having an undercut upper end to resist rotative and sliding movement of said member relative to said bracket and toward said upper pulley due to line tension.

3. In a device for tensioning clotheslines, a bracket having a vertically disposed elongated portion, an upper pulley supported by said bracket adjacent the upper end of said elongated portion, a pulley carrying member having a portion slidable upon said elongated portion, and a lower pulley supported by said member in spaced relationship to said slidable portion, said elongated portion of said bracket having a recess adjacent its lower end engageable by said member in its lowermost position, said recess having an undercut upper end to resist rotative and sliding movement of said member relative to said bracket and toward said upper pulley due to line tension, said bracket also having means to releasably hold said pulley carrying member in its uppermost position.

WILLIAM H. URBACH.